(12) United States Patent
Ji et al.

(10) Patent No.: US 12,204,205 B2
(45) Date of Patent: Jan. 21, 2025

(54) REFLECTIVE FILM, BACKLIGHT MODULE, AND DISPLAY APPARATUS

(71) Applicant: HONOR DEVICE CO., LTD., Shenzhen (CN)

(72) Inventors: Xuan Ji, Shenzhen (CN); Xiaoliang Mao, Shenzhen (CN); Xiaoyong Liu, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/567,542

(22) PCT Filed: Sep. 1, 2022

(86) PCT No.: PCT/CN2022/116616
§ 371 (c)(1),
(2) Date: Dec. 6, 2023

(87) PCT Pub. No.: WO2023/109197
PCT Pub. Date: Jun. 22, 2023

(65) Prior Publication Data
US 2024/0272477 A1 Aug. 15, 2024

(30) Foreign Application Priority Data
Dec. 13, 2021 (CN) .......................... 202111517368.1

(51) Int. Cl.
*G02F 1/13357* (2006.01)

(52) U.S. Cl.
CPC .. *G02F 1/133605* (2013.01); *G02F 1/133608* (2013.01); *G02F 1/133611* (2013.01)

(58) Field of Classification Search
CPC .......................... F21V 7/0066; G02F 1/133605
See application file for complete search history.

(56) References Cited

U.S. PATENT DOCUMENTS 9,383,605 B2   7/2016  Park et al.
2014/0218661 A1* 8/2014  Tanabe ............... G02F 1/133605
                                                         349/62

(Continued)

FOREIGN PATENT DOCUMENTS

CN        202947035 U      5/2013
CN        103454701 A     12/2013

(Continued)

OTHER PUBLICATIONS

Office Action for family case, EP 22905953.0 (Year: 2024).*

*Primary Examiner* — Keith G. Delahoussaye
(74) *Attorney, Agent, or Firm* — WOMBLE BOND DICKINSON (US) LLP (57) ABSTRACT

This application relates to the field of display technologies, to resolve a problem of collapsing or bulging of edges of reflective films in existing direct backlight modules, and provides a reflective film, a backlight module, and a display apparatus. The reflective film includes a reflective layer and a coating layer. The reflective layer includes a bottom and inclined parts extending around the bottom, folding lines are provided between the inclined parts and the bottom, and when the reflective film is folded along the folding lines, the inclined parts are inclined along peripheral edges of the bottom toward a side away from the bottom, and the bottom and the inclined parts together form an accommodating space. A plurality of through holes are provided at intervals in the bottom, and the inclined parts each include a front side facing the accommodating space and a rear side opposite to the front sides.

20 Claims, 5 Drawing Sheets

(56) References Cited

U.S. PATENT DOCUMENTS

| | | | |
|---|---|---|---|
| 2015/0049280 A1* | 2/2015 | Suzuki | G02F 1/133611 |
| | | | 349/62 |
| 2018/0143494 A1 | 5/2018 | Kim et al. | |
| 2019/0243172 A1* | 8/2019 | Gotou | G02F 1/1336 |
| 2021/0302646 A1 | 9/2021 | Park et al. | |
| 2023/0205007 A1 | 6/2023 | Cho et al. | |

FOREIGN PATENT DOCUMENTS

| | | |
|---|---|---|
| CN | 104819406 A | 8/2015 |
| CN | 207049680 U | 2/2018 |
| CN | 209265132 U | 8/2019 |
| CN | 210626837 U | 5/2020 |
| CN | 111323970 A | 6/2020 |
| CN | 112578589 A | 3/2021 |
| CN | 113917737 A | 1/2022 |
| EP | 2762957 A1 | 8/2014 |
| JP | 2016062765 A | 4/2016 |
| WO | 2012032978 A1 | 3/2012 |

* cited by examiner

REFLECTIVE FILM, BACKLIGHT MODULE, AND DISPLAY APPARATUS

CROSS-REFERENCE TO RELATED APPLICATIONS

This application is a national stage of International Application No. PCT/CN2022/116616, filed on Sep. 1, 2022, which claims priority to Chinese Patent Application No. 202111517368.1, filed on Dec. 13, 2021. The disclosures of both of the aforementioned applications are hereby incorporated by reference in their entireties.

TECHNICAL FIELD

This application relates to the field of display technologies, and in particular, to a reflective film, a backlight module using the reflective film, and a display apparatus using the backlight module.

BACKGROUND

A problem of collapsing or bulging of edges of a reflective film exists in existing direct backlight modules.

SUMMARY

A first aspect of this application provides a reflective film to resolve a problem of collapsing or bulging of edges of a reflective film in existing direct backlight modules. The reflective film includes:
  a reflective layer, where the reflective layer includes a bottom and inclined parts extending around the bottom, folding lines are provided between the inclined parts and the bottom, when the reflective film is folded along the folding lines, the inclined parts are inclined along peripheral edges of the bottom toward a side away from the bottom, the bottom and the inclined parts together form an accommodating space, a plurality of through holes are provided at intervals in the bottom, the inclined parts each include a front side facing the accommodating space and a rear side opposite to the front side, and the front side is configured to reflect light; and
  a coating layer, where the coating layer is provided on the reflective layer to increase stiffness of the reflective film.

In embodiments of this application, the coating layer is provided on the reflective layer to increase the stiffness of the reflective film (in other words, the stiffness of the reflective film provided with the coating layer is higher than stiffness of the reflective layer itself), so that an effective support is provided for the inclined parts of the reflective layer, thereby effectively mitigating the problem of collapsing or bulging of the edges of the reflective film, and improving a display effect of the display apparatus using the reflective film.

In some embodiments, a material of the coating layer is a transparent curable adhesive, and the transparent curable adhesive is provided at the rear side and/or the front side. In some other embodiments, the material of the coating layer is a white curable adhesive, the white curable adhesive is provided at the rear side. The white curable adhesive is, for example, a white emulgel. The transparent curable adhesive is, for example, a UV curable adhesive. The stiffness of the reflective film may be increased effectively after the transparent curable adhesive is applied and cured. In addition, because the transparent curable adhesive has a high light transmittance, even if the transparent curable adhesive is provided on the front side of the inclined part of the reflective layer, a normal function of the front sides of the reflective film is not affected. In addition, both the transparent curable adhesive and the white curable adhesive may be provided at the rear side of the inclined part to increase the stiffness of the reflective film, so as to mitigate problems such as the bugling of the reflective film and collapsing of the inclined part. Furthermore, provision of the transparent curable adhesive and the white curable adhesive at the rear side can further ensure that the function of the front side of the reflective film is not reflected. In addition, the coating layer is provided for the inclined parts, but not for a whole surface of the reflective layer, so that material cost of the coating layer can be reduced effectively.

In some embodiments, a thickness of the coating layer ranges from 50 μm to 200 μm. For example, the thickness of the coating layer ranges from 50 μm to 80 μm, 80 μm to 100 μm, 100 μm to 120 μm, 120 μm to 150 μm, 150 μm to 180 μm, or 180 μm to 200 μm. A thicker coating layer indicates better stiffness of the position on the reflective film corresponding to the coating layer. A thinner coating layer indicates lower material cost of the coating layer.

In some embodiments, the reflective layer is partially covered by the coating layer. Alternatively, the reflective layer is fully covered by the coating layer. The reflective layer is fully covered by the coating layer, to maximum an area of the coating layer, thereby improving the stiffness of the reflective film. The reflective layer is fully covered by the coating layer. In this way, the stiffness of the reflective film can be ensured. In addition, manufacturing processes are reduced, and materials are saved.

In some embodiments, the reflective layer is fully covered by the coating layer. The reflective film further includes an adhesive tape, and the adhesive tape is adhered to a side that is of the coating layer and that faces away from the reflective layer. For example, through one operation, the adhesive tape is fully adhered to a side that is of the coating layer and that faces away from the reflective layer. In this way, the process is simple, and time of the manufacturing process is reduced. Alternatively, a plurality of adhesive tapes are adhered at intervals onto a side that is of the coating layer and that faces away from the reflective layer, to reduce material cost. In some other embodiments, the reflective layer is partially covered by the coating layer. The reflective film further includes an adhesive tape, the adhesive tape is arranged at the same layer as the coating layer, and the adhesive tape is adhered to a position that is on the reflective layer and that is not covered by the coating layer.

In some embodiments, the reflective film further includes support structures, and the support structures each include a fixed surface fixed on the rear side, a supporting surface connected to the fixed surface and forming a first preset included angle with the rear side, and a transition surface connected to the fixed surface and forming a second preset included angle with the rear side. Preferably, the first preset included angle is close to or equal to 90 degrees, and the supporting surface is approximately perpendicular to the fixed surface, to support the reflective layer.

In some embodiments, in a direction perpendicular to the rear side, the fixed surface, the supporting surface, and the transition surface come together to form a triangle in a cross section of the support structure. A support structure with a triangular cross section provides a stable support and has a simple structure. Specifically, the triangle is a right triangle, which can provide better support for the reflective layer.

In some embodiments, the support structure further includes a joint surface that connects the transition surface and the supporting surface. The joint surfaces are configured to bond to a back plate (for example, the joint surfaces are bonded to side plates of the back plate by an adhesive layer), to enhance support of the support structures for the reflective layer, and prevent a problem of collapsing of the reflective film during an assembly process.

In some embodiments, in a direction perpendicular to the rear side, the fixed surface, the supporting surface, the joint surface, and the transition surface come together to form a right trapezoid in a cross section of the support structure, the fixed surface is a long side of the right trapezoid, and the joint surface is a short side of the right trapezoid. The support structure is approximately a quadrangular prism.

In some embodiments, the support structure further includes a first extending surface connected to the supporting surface and extending to cover the rear side, and a second extending surface connected to the transition surface and extending to cover the rear side. The first extending surface and the second extending surface are laminated and fixed onto the reflective layer, to effectively transit a connection between the support structure and the reflective layer, prevent affecting an effect of the front side of the reflective film, and maintain stability of the support structure in supporting the reflective layer.

In some embodiments, the first preset included angle ranges from 10 degrees to 90 degrees, and the second preset included angle ranges from 10 degrees to 90 degrees. For example, the first preset included angle ranges from 10 degrees to 20 degrees, 20 degrees to 30 degrees, 30 degrees to 40 degrees, 40 degrees to 50 degrees, 50 degrees to 60 degrees, 60 degrees to 70 degrees, 70 degrees to 80 degrees, or 80 degrees to 90 degrees. The second preset included angle ranges from 10 degrees to 20 degrees, 20 degrees to 30 degrees, 30 degrees to 40 degrees, 40 degrees to 50 degrees, 50 degrees to 60 degrees, 60 degrees to 70 degrees, 70 degrees to 80 degrees, or 80 degrees to 90 degrees. Preferably, one of the first preset included angle and the second preset included angle is close to 90 degrees, to play a main role in supporting the reflective layer.

In some embodiments, the first preset included angle is close to or equal to 90 degrees, the supporting surface is approximately perpendicular to the fixed surface. A larger second preset included angle indicates a smaller area of the transition surface and a larger area of the joint surface, so that the bonding between the joint surface and the back plate is more stable, in the direction perpendicular to the rear side, the quadrangle formed by the fixed surface, the supporting surface, the joint surface, and the transition surface coming together in a cross section of the support structure is more like a rectangle, a mechanical strength of the support structure is higher, and the support for the reflective layer is more stable. However, when the fixed surface and the supporting surface are constant, a smaller second preset included angle indicates a larger area of the transition surface and a more gentle inclination of the connection between the support structure and the reflective layer, thereby effectively preventing a problem of bulging of the reflective layer at the support structure because the side plates provide a support force to the support structure toward the reflective layer at the support structure after the transmit film is lapped on the back plate. In addition, in configuration of the first preset included angle and the second preset included angle, adjustment of a reflection effect of the reflective layer on light emitted by the light-emitting elements also needs to be considered, to ensure that when the support structures stably support the reflective layer, efficiency of the reflective layer in reflecting light emitted by the light-emitting elements is highest.

In some embodiments, the support structure includes an organic base and a plurality of inorganic particles dispersed in the organic base. A material of the organic base is, for example but not limited to, PET. The inorganic particles are, for example but not limited to, zirconia, niobium oxide, or silicon oxide. The inorganic particles are dispersed in the organic base, so that the stiffness of the support structure is improved, and the inorganic particles can refract or reflect light to facilitate convergence of light toward a side of the liquid crystal display panel, thereby improving light utilization.

In some embodiments, a thickness of the organic base ranges from 50 μm to 300 μm. For example, the thickness of the organic base ranges from 50 μm to 80 μm, 80 μm to 120 μm, 120 μm to 150 μm, 150 μm to 200 μm, 200 μm to 250 μm, or 250 μm to 300 μm. Specifically, the thickness of the organic base may be selected based on a structure of the back plate that matches the reflective film, to at least ensure that after the reflective film obtained by laminating the organic base and the reflective layer is lapped on the back plate, the support structures abut against the back plate, rather than suspending relative to the back plate. In addition, before laminated to the reflective layer, the thickness of the organic base is approximately uniform, and during laminating the organic base to the reflective layer, a partial region of the organic base becomes thinner after being laminated to the reflective layer, to form a first extending surface and a second extending surface. The thickness of the organic base that ranges from 50 μm to 300 μm refers to a thickness before the organic base being laminated to the reflective layer.

A second aspect of this application provides a backlight module, including:
  a back plate, where the back plate includes a bottom plate and side plates that surround the bottom plate and extend inclinedly along peripheral edges of the bottom plate toward a side away from the bottom plate;
  a plurality of light-emitting elements, located on the bottom plate; and
  the reflective film according to the first aspect of this application, where inclined parts are lapped on the side plates, positions of bottoms of the inclined parts correspond to the bottom plate, and each of the light-emitting elements is exposed out of one of through holes and is located in an accommodating space of the reflective film.

The backlight module is a direct-lit module. Because the backlight module includes the reflective film according to the first aspect of this application, backlight emitted is even.

In some embodiments, when the reflective film includes support structures, the support structures abut against the side plates, to support the reflective layer. In peripheral gaps, provision of the support structures can enhance support between the reflective film and the back plate without affecting a normal function of the front side of the reflective film, to effectively mitigate problems such as bulging and collapsing of inclined surfaces of the reflective film.

In some embodiments, when the support structures include joint surfaces, the joint surfaces are bonded to the side plates by an adhesive layer, to further enhance stability of the support structures in supporting the reflective layer.

A third aspect of this application provides a display apparatus, including:
  a liquid crystal display panel; and the backlight module according to the second aspect of this application, where the backlight module is located at a side that is of the liquid crystal display panel and that faces away from a display surface of the liquid crystal display panel.

Because the backlight module according to the second aspect emits even backlight, the display apparatus does not have a problem of bright or dark spots caused by collapsing or bulging of the reflective film, and therefore has a good display effect.

DESCRIPTION OF MAIN REFERENCE SIGNS

Display apparatus 100a, 100b, 100c
Liquid crystal display panel 10
Buffer layer 20
Middle frame 30
Bearing surface 31
Slot 32
Backlight module 40
Back plate 41
Bottom plate 411
Side plate 412
Bending part 412a
Bearing part 412b
Snap-fit part 412c
Circuit board 42
Light-emitting element 43
Diffuser plate 44
Optical film assembly 45
Reflective film 50a, 50b, 50c, 50d, 50e
Accommodating space S
Reflective layer 51
Bottom 511
Through hole 511a
Inclined part 512
Front side 512a
Rear side 512b
First inclined part 5121
Second inclined part 5122
Third inclined part 5123
Fourth inclined part 5124
Coating layer 52
Adhesive tape 53
Support structure 54
Fixed surface 54
Supporting surface 542
Transition surface 543
First preset included angle β
Second preset included angle α
Joint surface 544
First extending surface 545
Second extending surface 546
Side surface 547
Gap G
Folding line L This application is further described in the following specific embodiments with reference to the accompanying drawings.

DESCRIPTION OF EMBODIMENTS

Figure 1:
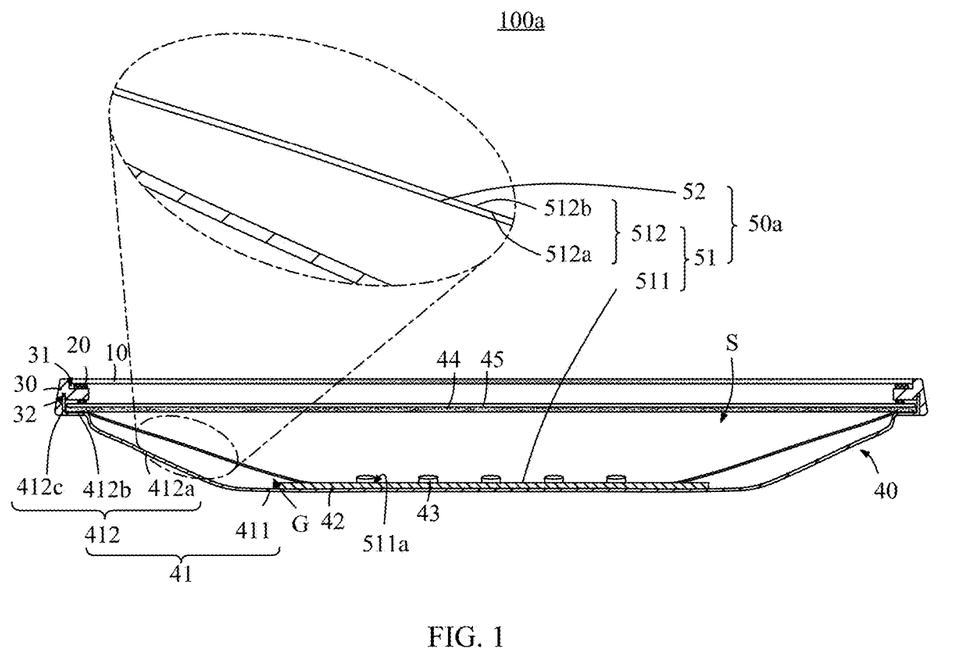
FIG. 1 is a schematic diagram of a structure of a display apparatus according to an embodiment of this application.

FIG. 1 is a schematic diagram of a structure of a display apparatus 100a according to an embodiment of this application. The display apparatus 100a may be, for example, a display, a tablet computer, or a television. As shown in FIG. 1, the display apparatus 100a includes a liquid crystal display panel 10, a buffer layer 20, a middle frame 30, and a backlight module 40.

The liquid crystal display panel 10 is configured to display an image. The backlight module 40 is located at a side that is of the liquid crystal display panel 10 and that faces away from the display side, and the backlight module 40 is a direct backlight module and is configured to provide backlight for the liquid crystal display panel 10. The middle frame 30 is configured to bear the liquid crystal display panel 10, and is connected to the backlight module 40. Specifically, the middle frame 30 includes a bearing surface 31, and the liquid crystal display panel 10 is attached on the bearing surface 31. The buffer layer 20 is provided on the bearing surface 31, and is located between the liquid crystal display panel 10 and the middle frame 30. The buffer layer 20 is approximately ring-shaped, and the buffer layer 20 may be adhered to the middle frame 30 and the liquid crystal display panel 10 by using a double-sided adhesive tape (not shown). A material of the buffer layer 20 is, for example, black foam. The black foam can absorb light, to prevent leakage of light of the backlight module 40 from a joint between the liquid crystal display panel 10 and the middle frame 30, and mitigate a light leakage problem. In addition, the black foam has a buffering function, to prevent breakage and failure of an array substrate of the liquid crystal display panel 10 caused by squeezing or impact on the liquid crystal display panel 10 during transportation.

The backlight module 40 includes a back plate 41, a circuit board 42 located on the back plate 41, a plurality of light-emitting elements 43 located on the circuit board 42 and electrically connected to the circuit board 42, a reflective film 50a located on a side that is of the back plate 41 and that is close to the liquid crystal display panel 10, a diffuser plate 44 located a side that is of the reflective film 50a and that is close to the liquid crystal display panel 10, and an optical film assembly 45 stacked on the diffuser plate 44 and located on a side that is of the diffuser plate 44 and that is close to the liquid crystal display panel 10. The back plate 41 is made of, for example, metal, and has a good mechanical strength. The main circuit board 42 is, for example, a rigid circuit board, a flexible circuit board, or a rigid-flex circuit board.

The light-emitting element 43 is configured to emit a light beam, and the light-emitting element 43 is, for example, a light emitting diode (Light Emitting Diode, LED) lamp bead. The reflective film 50a is lapped on the back plate 41, and is configured to reflect light from the light-emitting element 43 toward the liquid crystal display panel 10, to improve light utilization. The diffuser plate 44 is configured to evenly diffuse light incident onto the diffuser plate 44. The optical film assembly 45 include, for example but not limited to, a brightness enhancement film and a light guide plate that are sequentially stacked along a direction moving away from the liquid crystal display panel 10.

The back plate 41 includes a bottom plate 411 and side plates 412 surrounding the bottom plate 411 and extending incliningly along edges of the bottom plate 411 toward a side away from the bottom plate 411. The side plate 412 includes a bending part 412a, a bearing part 412b and a snap-fit part 412c that sequentially extending from the bottom plate 411. The middle frame 30 is provided with a slot 32, the snap-fit part 412c matches the slot 32, and the snap-fit part 412c is snapped into the slot 32, so that the middle frame 30 is snapped onto the back plate 41. In another embodiment, a connection between the middle frame 30 and the side plates 412 may be, but is not limited to, a threaded connection. The bearing part 412b is configured to bear the reflective film 50a, the diffuser plate 44, the optical film assembly 45, and the like.

The bottom plate 411 of the back plate 41 and the side plates 412 of the back plate 41 come together to form space with a substantially trapezoidal cross section. The circuit board 42, the light-emitting elements 43, and the reflective film 50a are located in the trapezoidal space. The circuit board 42 is located on the bottom plate 411.

The reflective film 50a includes a reflective layer 51 and a coating layer 52. A material of the reflective layer 51 is, for example but not limited to, polyethylene glycol terephthalate (polyethylene glycol terephthalate, PET).

Figure 2:
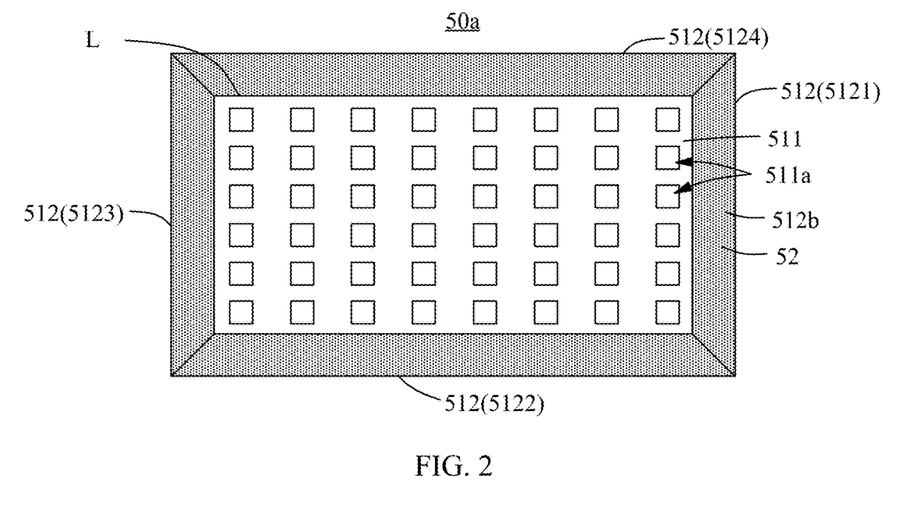
FIG. 2 is a schematic diagram of a structure of a reflective film in FIG. 1.

The reflective layer 51 includes a bottom 511 and inclined parts 512 extending around the bottom 511. The bottom 511 is flat, folding lines L (as shown in FIG. 2) are provided between the bottom 511 and the inclined parts 512 of the reflective film 50a, and the folding lines are, for example, roulettes. The inclined parts 512 are inclined along edges of the bottom 511 toward a side away from the bottom 511 when the reflective film 50a is folded along the folding lines L, and the bottom 511 and the inclined parts 512 together form an accommodating space S. The bottom 511 of the reflective film 50a is disposed at a position corresponding to the bottom plate 411 of the back plate 41. A plurality of through holes 511a are provided at intervals in the bottom 511 of the reflective film 50a. Shapes and dimensions of the plurality of through holes 511a are matched with those of the plurality of light-emitting elements 43. Each light-emitting element 43 is exposed out of one through hole 511a and located in the accommodating space S. The inclined parts 512 of the reflective film 50a are attached on the side plates 412 of the back plate 41, and the inclined parts 512 of the reflective layer 51 each forms a gap G with the bending part 412a of the back plate 41. Specifically, the inclined parts 512 of the reflective film 50a and the bearing part 412b of the back plate 41 may be bonded to each other by, but is not limited to, an adhesive.

It should be noted that, in related technologies, when the reflective film is mounted on a direct-lit back plate, because the side plates of the back plate are designed to be inclined, after the reflective film is lapped on the bearing part of the back plate, a suspending region is formed between the reflective film and the back plate. Because the reflective film is hard to maintain an original plane shape due to its soft material, when the reflective film is mounted onto the back plate in a production line, bulges are very likely to appear on edges during assembly, leading to bright or dark spots on the edges of the display apparatus. As a result, a display effect is affected. In addition, due to the stiffness of the reflective film, a large-size display apparatus has a large suspending region. This may cause a problem of collapsing of the edges in scenarios such as abnormal transportation and vibration, which seriously affects the display effect. However, in an embodiment of this application, in the direct backlight module, to mitigate a problem of collapsing or bugling of the edges of the reflective film when the reflective film is mounted to the back plate or in a scenario such as abnormal transportation and vibration, a reflective film with an edge-reinforced design is provided.

Specifically, the inclined parts 512 of the reflective film 50a include front sides 512a close to the liquid crystal display panel 10 (or in other words, facing the accommodating space S) and configured to reflect light, and rear sides 512b opposite to the front sides 512a. The coating layer 52 is provided at the rear side 512b of the reflective layer 51.

A material of the coating layer 52 is a transparent curable adhesive or a white curable adhesive. After the adhesive is applied and cured, the stiffness of the reflective film 50a can be increased effectively, without affecting a normal function of the front side 512a of the reflective film 50a. Therefore, problems such as bulging of the reflective film 50a and collapsing of the inclined parts 512 can be mitigated effectively. When the coating layer 52 is the transparent curable adhesive, the coating layer 52 is not limited to be provided at the rear side 512b of the inclined part 512, and can also be provided at the front side 512a of the inclined part 512. In this way, the transparent curable adhesive can effectively increase the stiffness of the reflective film, and because the transparent curable adhesive has a good light transmittance, even if being provided on the front side of the inclined part of the reflective layer, the transparent curable adhesive does not affect a normal function of the front side of the reflective film. In addition, the coating layer 52 is provided for the inclined parts 512, but not for a whole surface of the reflective layer 51. Therefore, material cost of the coating layer 52 can be reduced effectively. In another embodiment, the coating layer 52 is, but not limited to, provided at the inclined parts. For example, when the coating layer 52 is the transparent curable adhesive, the coating layer 52 may further be provided at a front side that is of the bottom and that is configured to reflect the light and/or a rear side that is of the bottom and that is opposite to the front side. When the coating layer 52 is the white curable adhesive, the coating layer 52 may alternatively be provided at the rear side of the bottom. When the coating layer 52 is provided at surfaces that are of the bottom and the inclined part and that are at the same side (for example, the coating layer 52 is provided at the front side of the bottom and the front side of the inclined part, or the coating layer is provided at the rear side of the bottom and the rear side of the inclined part), the coating layer 52 on the inclined part and on the bottom can be formed through one manufacturing process, to simplify the manufacturing process. In addition, the stiffness of the whole reflective film can be enhanced by forming the coating layer at the bottom and the inclined parts.

Specifically, the transparent curable adhesive is, for example, a UV curable acrylate adhesive or transparent room-temperature-curing epoxy resin adhesive. The UV curable acrylate adhesive can quickly (within seconds) be transitioned from liquid to solid after irradiation with UV light. A curing rate of the adhesive is fast, so that time of a manufacturing process is reduced, and production efficiency is improved. In addition, the cured UV curable acrylate adhesive has a high light transmittance (greater than or equal to 90%), and allows most of light to be incident to the reflective layer through the cured UV curable acrylate adhesive and then be reflected by the reflective layer, thereby improving light source utilization of the reflective film. Further, the UV curable acrylate adhesive further has advantages such as yellowing prevention and moisture resistance. This facilitates ensuring reliability of the reflective film in use. The transparent room-temperature-curing epoxy resin adhesive has a good mechanical property and a low curing shrinkage rate. This facilitates ensuring stiffness and flatness of the reflective film. In addition, the transparent room-temperature-curing epoxy resin adhesive further has a good resistance to chemicals. This facilitates ensuring the reliability of the reflective film in use. Furthermore, the transparent room-temperature-curing epoxy resin adhesive is curable in a room temperature, so that a preparation process of the reflective film is simplified.

The white curable adhesive is, for example but not limited to, a polyvinyl acetate adhesive. The polyvinyl acetate adhesive is a thermoplastic adhesive obtained by polymerization of vinyl acetate monomer. According to different manners of polymerization, polyvinyl acetate adhesives are classified into a solution type and an emulsion type, and generally the emulsion type is more widely used. A vinyl acetate emulsion is commonly known as white emulgel or white glue, and has advantages such as pollution-free, low cost, high adhesion, fast curing speed, simple production process, and usage convenience. Therefore, when the vinyl acetate emulsion is applied on the reflective layer, the reflective film may have corresponding advantages such as environmental protection, low cost, high stiffness, and high production efficiency.

FIG. 2 is a schematic diagram of a structure of a reflective film 50a in FIG. 1. As shown in FIG. 2, the bottom 511 of the reflective layer 51 is substantially rectangular. Each through hole 511a in the bottom 511 is substantially rectangular, and a plurality of through holes 511a are arranged in multiple rows and multiple columns. The inclined parts 512 include four inclined sections extending separately from four edges of the bottom 511 and connected sequentially, that is, a first inclined part 5121, a second inclined part 5122, a third inclined part 5123, and a fourth inclined part 5124. The first inclined part 5121 and the third inclined part 5123 are opposite to each other and extend from two short sides of the rectangle. The second inclined part 5122 and the fourth inclined part 5124 are opposite to each other and extend from two long sides of the rectangle. The first inclined part 5121, the second inclined part 5122, the third inclined part 5123 and the fourth inclined part 5124 are each substantially in a shape of an isosceles trapezoid.

The rear side 512b of the inclined part 512 is fully covered by the coating layer 52, to maximum an area of the coating layer 52 and improve the stiffness of the reflective film 50a.

In another embodiment, a shape of the bottom 511, shapes of the inclined parts 512, and shapes and arrangements of the through holes 511a are not limited to those mentioned. For example, the bottom 511 may be in a shape of a parallelogram, an ellipse, or the like. The first inclined part 5121, the second inclined part 5122, the third inclined part 5123, or the fourth inclined part 5124 may be formed by jointing a plurality of parts, rather than an integrally formed trapezoid. The through holes 511a may be circular holes, elliptical holes, or the like.

A thickness of the coating layer 52 ranges from 50 μm to 200 μm. For example, the thickness of the coating layer 52 ranges from 50 μm to 80 μm, 80 μm to 100 μm, 100 μm to 120 μm, 120 μm to 150 μm, 150 μm to 180 μm, and 180 μm to 200 μm. A thicker coating layer 52 indicates higher stiffness of the position on the reflective film 50a corresponding to the coating layer 52. A thinner coating layer 52 indicates lower material cost of the coating layer 52.

Figure 3:
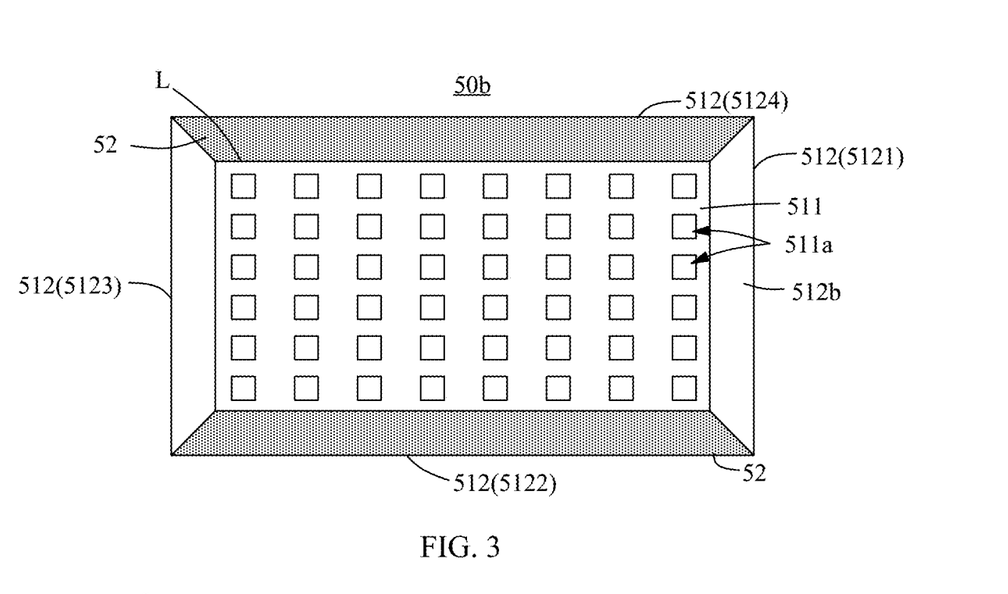
FIG. 3 is a schematic diagram of a structure of a reflective film according to another embodiment of this application.

FIG. 3 is a schematic diagram of a structure of a reflective film 50b according to another embodiment of this application. As shown in FIG. 3, rear sides 512b of inclined parts 512 are partially covered by a coating layer 52. A surface of a second inclined part 5122 and a surface of a fourth inclined part 5124 are covered by the coating layer 52. The coating layer 52 is provided on surfaces of the inclined parts 512 extending along two long sides of a bottom 511. In this way, stiffness of the reflective film 50b can be ensured. In addition, the manufacturing process is simplified, and materials are saved. In addition, the provision of the coating layer 52 on opposite inclined parts 512 of a reflective layer 51 enables mechanical performance of the reflective film 50b to be relatively symmetrical. In another embodiment, the coating layer 52 may alternatively be provided on one or three inclined parts 512, or the coating layer 52 is provided on each inclined part 512 at intervals. This is not limited herein.

Figure 4:
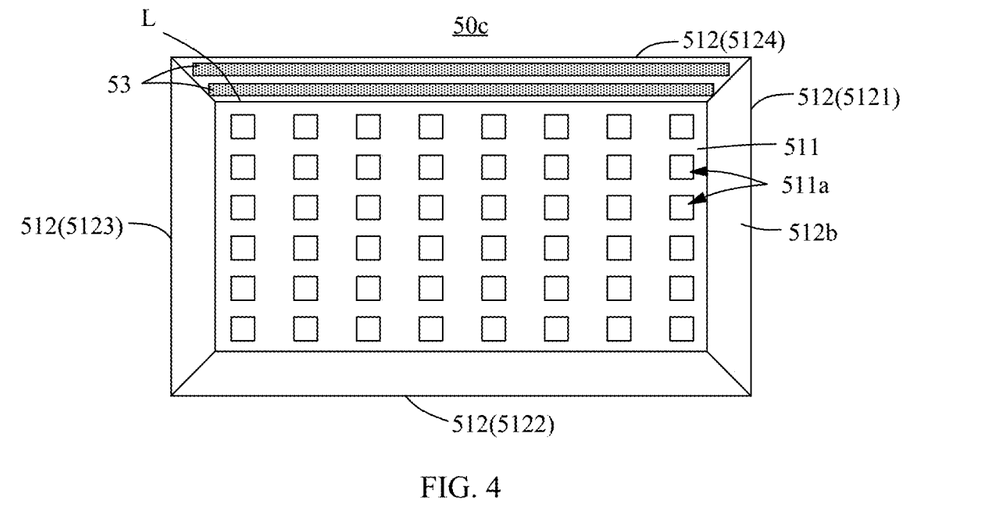
FIG. 4 is a schematic diagram of a structure of a reflective film according to yet another embodiment of this application.

FIG. 4 is a schematic diagram of a structure of a reflective film 50c according to yet another embodiment of this application. As shown in FIG. 4, no coating layer 52 is provided on inclined parts 512 of a reflective layer 51, but an adhesive tape 53 is adhered on the inclined parts 512. The adhesive tape 53 is adhered on a rear side 512b of a fourth inclined part 5124. The adhesive tape 53 can improve stiffness of the reflective film 50c and mitigate problems such as bulging and collapsing of the inclined parts 512 of the reflective film 50c.

In another embodiment, the adhesive tape 53 may be fully adhered to surfaces of the inclined parts 512, or the adhesive tape 53 may be partially adhered to the surfaces of the inclined parts 512. This is not limited herein. In a case that the adhesive tape 53 is fully adhered to the surfaces of the inclined parts 512, the process is simple, and time of the manufacturing process is reduced. In a case that a plurality of adhesive tapes 53 are adhered to the surfaces of the inclined parts 512 at intervals, material cost can be reduced.

In some embodiments, the reflective layer of the reflective film may be provided with both the coating layer and the adhesive tape. For example, the reflective layer may be fully covered by the coating layer (for example, a front side and/or a rear side of the reflective layer are/is fully covered by the coating layer), and the adhesive tape is adhered to a side that is of the coating layer and that faces away from the reflective layer. Through one operation, the adhesive tape is fully adhered to a side that is of the coating layer and that faces away from the reflective layer. In this way, the process is simple, and time of the manufacturing process is reduced. Alternatively, a plurality of adhesive tapes are adhered at intervals onto a side that is of the coating layer and that faces away from the reflective layer, to reduce material cost. For another example, the reflective layer is partially covered by the coating layer, the adhesive tape is arranged at the same layer as the coating layer, and the adhesive tape is adhered to a position that is on the reflective layer and that is not covered by the coating layer. Specifically, the rear side 512b of the inclined part 512 is partially covered by the coating layer 52, and the adhesive tape 53 may be adhered in a region that is of the rear side 512b of the inclined part 512 and that is not covered by the coating layer 52. Alternatively, the rear side 512b of the inclined part 512 is fully covered by the coating layer 52, and the adhesive tape 53 is adhered to a surface that is of the coating layer 52 and that is away from the inclined part 512, or the plurality of adhesive tapes 53 are adhered to the surface that is of the coating layer 52 and that is away from the inclined part 512.

Figure 5:
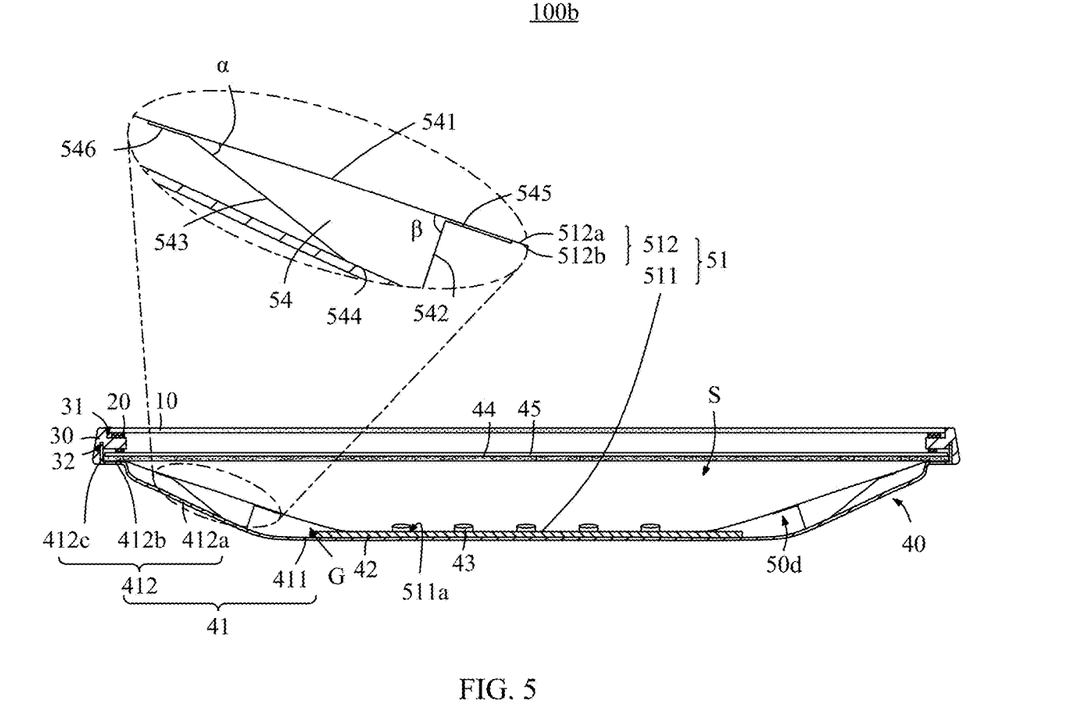
FIG. 5 is a schematic diagram of a structure of a display apparatus according to another embodiment of this application.

FIG. 5 is a schematic diagram of a structure of a display apparatus 100b according to another embodiment of this application. A difference between the display apparatus 100b in FIG. 5 and the display apparatus 100a in FIG. 1 is that, in the display apparatus 100b, the rear side 512b of the inclined part 512 of the reflective layer 51 is not provided with the coating layer 52 but is provided with support structures 54.

As shown in FIG. 5, the support structures 54 abut against bending parts 412a of a back plate 41, to support the reflective layer 51. In peripheral gaps, the provision of the support structures 54 can effectively enhance support between a reflective film 50d and the back plate 41, without affecting a normal function of a front side 512a of the reflective film 50d, to effectively mitigate problems such as bulging and collapsing of inclined surfaces of the reflective film 50d.

Specifically, each support structure 54 includes a fixed surface 541, a first extending surface 545, a supporting surface 542, a joint surface 544, a transition surface 543, and a second extending surface 546 that are connected sequentially. The fixed surface 541 is laminated and fixed onto the rear side 512b of the inclined part 512 of the reflective layer 51. The supporting surface 542 connects the fixed surface 541 and the first extending surface 545, and forms a first preset included angle $\beta$ with the rear side 512b of the inclined part 512. Preferably, the first preset included angle is close to or equal to 90 degrees, the bending part 412a of the back plate 41 is approximately parallel with the inclined parts 512 of the reflective layer 51, so that the supporting surface 542 is approximately perpendicular to the bending part 412a of the back plate 41, to support the reflective layer 51. The joint surface 544 connects the transition surface 543 and the supporting surface 542, and is adhered to the bending part 412a of the back plate 41. For example, the joint surfaces 544 are bonded to the side plates 412 by an adhesive layer, to further enhance stability of the support structures 54 in supporting the reflective layer 51. The transition surface 543 connects the second extending surface 546 and the fixed surface 541, and forms a second preset included angle $\alpha$ with the rear side 512b of the inclined part 512, to be lapped on the rear side 512b of the reflective layer 51 via the second extending surface 546. The first extending surface 545 is connected to the supporting surface 542 and extends to cover the rear side 512b of the inclined part 512. The second extending surface 546 connects the transition surface 543 and the fixed surface 541, and extends to cover the rear side 512b of the inclined part 512. In a direction perpendicular to the rear side 512b, the fixed surface 541, the supporting surface 542, the joint surface 544, and the transition surface 543 come together to form a right trapezoid in a cross section of the support structure 54, the supporting surface 542 is perpendicular to the fixed surface 541, the fixed surface 541 is a long side of the trapezoid, and the joint surface 544 is a short side of the right trapezoid.

In some embodiments, the first extending surface 545 and the second extending surface 546 are laminated and fixed onto the reflective layer 51, to effectively transit a connection between the support structure 54 and the reflective layer 51, prevent affecting an effect of the front side 512a of the reflective film 50d, and maintain stability of the support structure 54 in supporting the reflective layer 51. Specifically, the first extending surface 545 is in direct contact with the reflective layer 51, and there are no other film layers between the first extending surface 545 and the reflective layer 51. The second extending surface 546 is in direct contact with the reflective layer 51, and there are no other film layers between the second extending surface 546 and the reflective layer 51.

In some embodiments, the first preset included angle $\beta$ ranges from 10 degrees to 90 degrees, and the second preset included angle $\alpha$ ranges from 10 degrees to 90 degrees. For example, the first preset included angle ranges from 10 degrees to 20 degrees, 20 degrees to 30 degrees, 30 degrees to 40 degrees, 40 degrees to 50 degrees, 50 degrees to 60 degrees, 60 degrees to 70 degrees, 70 degrees to 80 degrees, or 80 degrees to 90 degrees. The second preset included angle $\alpha$ ranges from 10 degrees to 20 degrees, 20 degrees to 30 degrees, 30 degrees to 40 degrees, 40 degrees to 50 degrees, 50 degrees to 60 degrees, 60 degrees to 70 degrees, 70 degrees to 80 degrees, or 80 degrees to 90 degrees. Preferably, one of the first preset included angle $\beta$ and the second preset included angle $\alpha$ is close to 90 degrees, to support the reflective layer 51.

In some embodiments, the first preset included angle $\beta$ is close to or equal to 90 degrees, the supporting surface 542 is approximately perpendicular to the fixed surface 541. A larger second preset included angle $\alpha$ indicates a smaller area of the transition surface 543 and a larger area of the joint surface 544, so that the bonding between the joint surface 544 and the back plate 41 is more stable, in the direction perpendicular to the rear side 512b, the quadrangle formed by the fixed surface 541, the supporting surface 542, the joint surface 544, and the transition surface 543 coming together in a cross section of the support structure 54 is more like a rectangle, a mechanical strength of the support structure 54 is higher, and the support for the reflective layer 51 is more stable. However, a smaller second preset included angle $\alpha$ indicates a larger area of the transition surface 543 and a more gentle inclination of the connection between the support structure 54 and the reflective layer 51, thereby effectively preventing a problem of bulging of the reflective layer 51 at the support structure 54 because the side plates 412 provide a support force to the support structure 54 toward the reflective layer 51 at the support structure after the transmit film is lapped 41 on the back plate 41. In addition, in configuration of the first preset included angle $\beta$ and the second preset included angle $\alpha$, adjustment of a reflection effect of the reflective layer 51 on light emitted by the light-emitting elements 43 also needs to be considered, to ensure that when the support structures 54 stably support the reflective layer 51, efficiency of the reflective layer 51 in reflecting light emitted by the light-emitting elements 43 is maximum.

In some embodiments, the support structure 54 includes an organic base and a plurality of inorganic particles dispersed in the organic base. A material of the organic base is, for example but not limited to, PET. The inorganic particles are, for example but not limited to, zirconia, niobium oxide, or silicon oxide. The inorganic particles are dispersed in the organic base, so that the stiffness of the support structure 54 is improved, and the inorganic particles can refract or reflect light to facilitate convergence of light toward a side of the liquid crystal display panel 10, thereby improving light utilization.

In some embodiments, a thickness of the organic base ranges from 50 μm to 300 μm. For example, the thickness of the organic base ranges from 50 μm to 80 μm, 80 μm to 120 μm, 120 μm to 150 μm, 150 μm to 200 μm, 200 μm to 250 μm, or 250 μm to 300 μm. Specifically, the thickness of the organic base may be selected based on a structure of the back plate that matches the reflective film, to at least ensure that after the reflective film obtained by laminating the organic base and the reflective layer is lapped on the back plate, the support structures abut against the back plate, rather than suspending relative to the back plate. In addition, before laminated to the reflective layer, the thickness of the organic base is approximately uniform, and during laminating the organic base to the reflective layer, a partial region of the organic base becomes thinner after being laminated to the reflective layer, to form a first extending surface and a second extending surface. The thickness of the organic base that ranges from 50 μm to 300 μm refers to a thickness before the organic base being laminated to the reflective layer.

Figure 6:
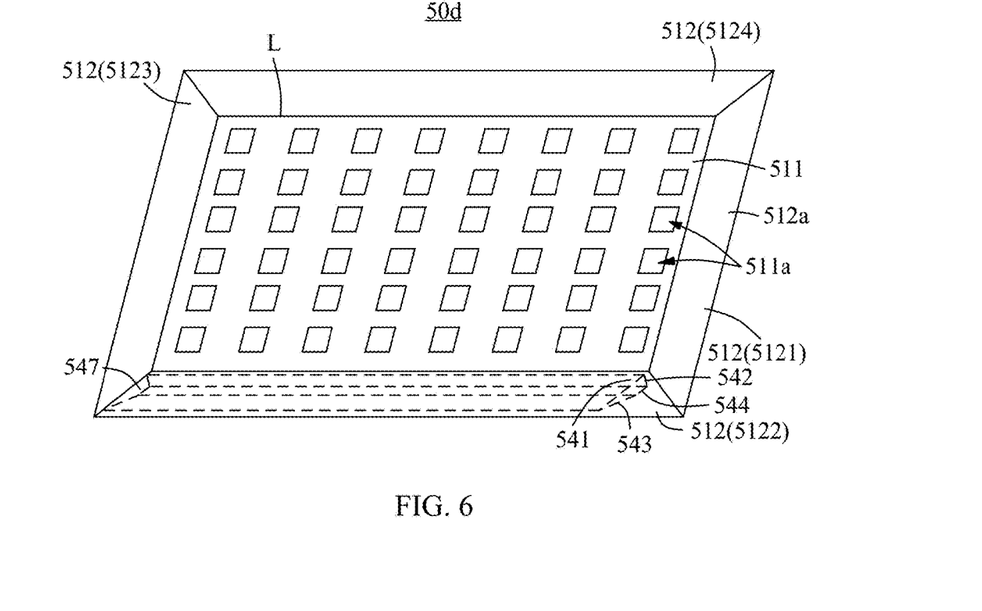
FIG. 6 is a schematic diagram of a front side of a reflective film in FIG. 5.

FIG. 6 is a schematic diagram of a front side 512a of a reflective film 50d in FIG. 5. For clear description, in FIG. 6, only a support structure 54 on the third inclined part 5123 is drawn, the support structures 54 on the other three inclined parts 512 are omitted. In addition, in FIG. 6, the first extending surface 545 and the second extending surface 546 of the support structure 54 are omitted. As shown in FIG. 6, the support structure 54 further includes two side surfaces 547 relative to each other. The side surfaces 547 connect the fixed surface 541, the supporting surface 542, the joint surface 544 and the transition surface 543 The side surface 547 is substantially in a shape of a right trapezoid, and the side surfaces 547, the fixed surface 541, the supporting surface 542, the joint surface 544, and the transition surface 543 come together to form a quadrangular prism substantially.

Figure 7:
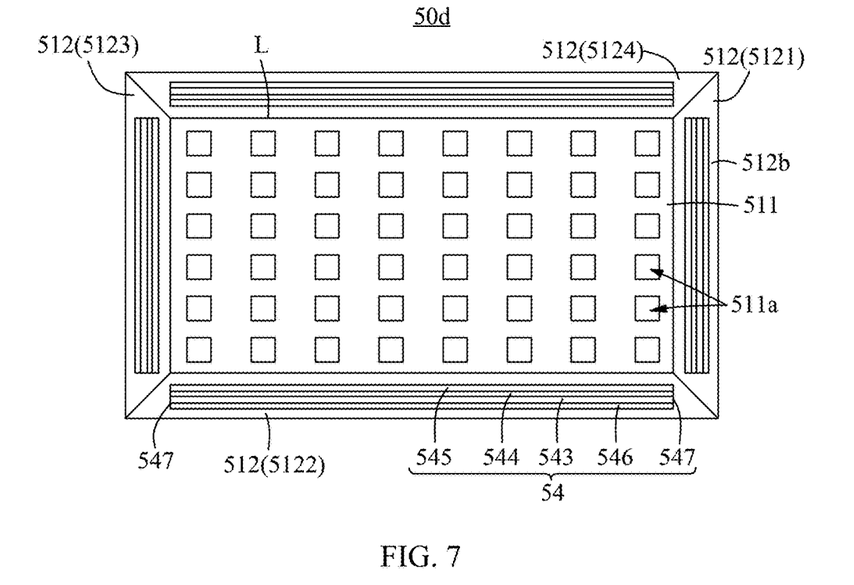
FIG. 7 is a schematic diagram of a rear side of the reflective film in FIG. 5.

FIG. 7 is a schematic diagram of a rear side 512b of a reflective film 50d in FIG. 5. As shown in FIG. 7, a rear side 512b of each inclined part 512 is provided with a support structure 54 to maximally improve a stiffness of the inclined parts 512 of the reflective film 50d and fill gaps G between the reflective layer 51 and the inclined parts 512 of the back plate 41, to effectively mitigate problems such as bulging and collapsing of inclined surfaces of the reflective film 50d.

Figure 8:
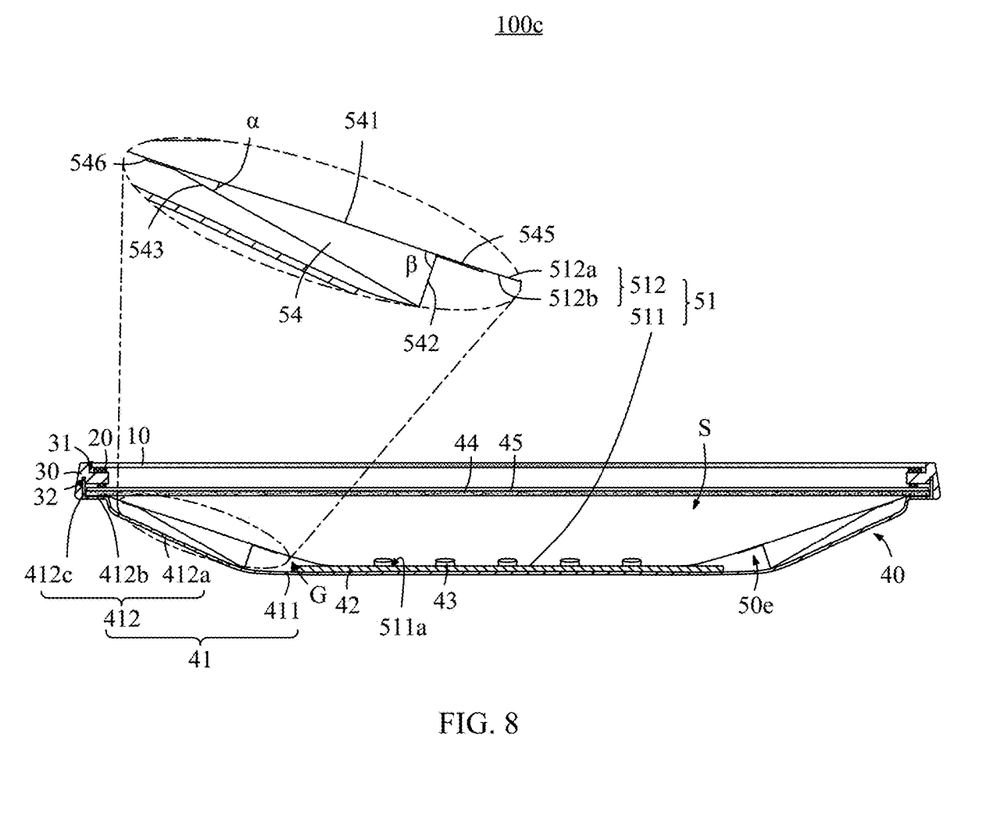
FIG. 8 is a schematic diagram of a structure of a display apparatus according to yet another embodiment of this application.

FIG. 8 is a schematic diagram of a structure of a display apparatus 100c according to an embodiment of this application. A difference between the display apparatus 100c shown in FIG. 8 and the display apparatus 100b shown in FIG. 5 is that the support structure 54 does not include the joint surface in the display apparatus 100c. In a direction perpendicular to the rear side 512b, the fixed surface 541, the supporting surface 542, and the transition surface 543 come together to form a triangle in a cross section of the support structure 54. A support structure 54 with a triangular cross section provides a stable support and a simple structure. Specifically, the triangle is a right triangle, and can provide better support for the reflective layer 51.

Figure 9:
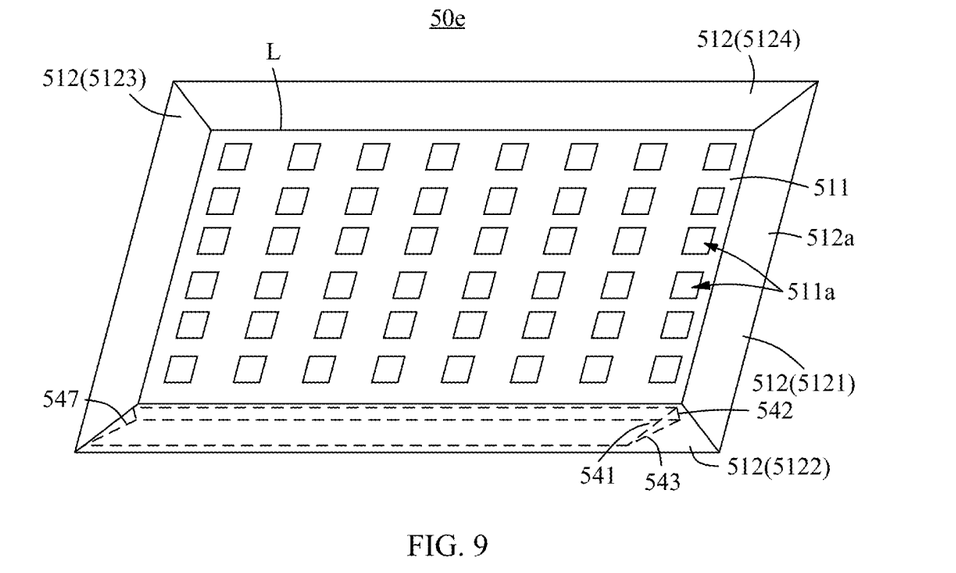
FIG. 9 is a schematic diagram of a front side of a reflective film in FIG. 8.

FIG. 9 is a schematic diagram of a front side 512a of a reflective film 50e in FIG. 8. Similarly, for clear description, in FIG. 9, only a support structure 54 on the third inclined part 5123 is drawn, the support structures 54 on the other three inclined parts 512 are omitted. In addition, in FIG. 9, the first extending surface 545 and the second extending surface 546 of the support structure 54 are omitted. As shown in FIG. 9, the support structure 54 further includes two side surfaces 547 relative to each other. The side surfaces 547 connect the fixed surface 541, the supporting surface 542 and the transition surface 543. The side surface 547 is substantially in a shape of a right triangle, and the side surfaces 547, the fixed surface 541, the supporting surface 542, and the transition surface 543 come together to form a triangular prism substantially.

Figure 10:
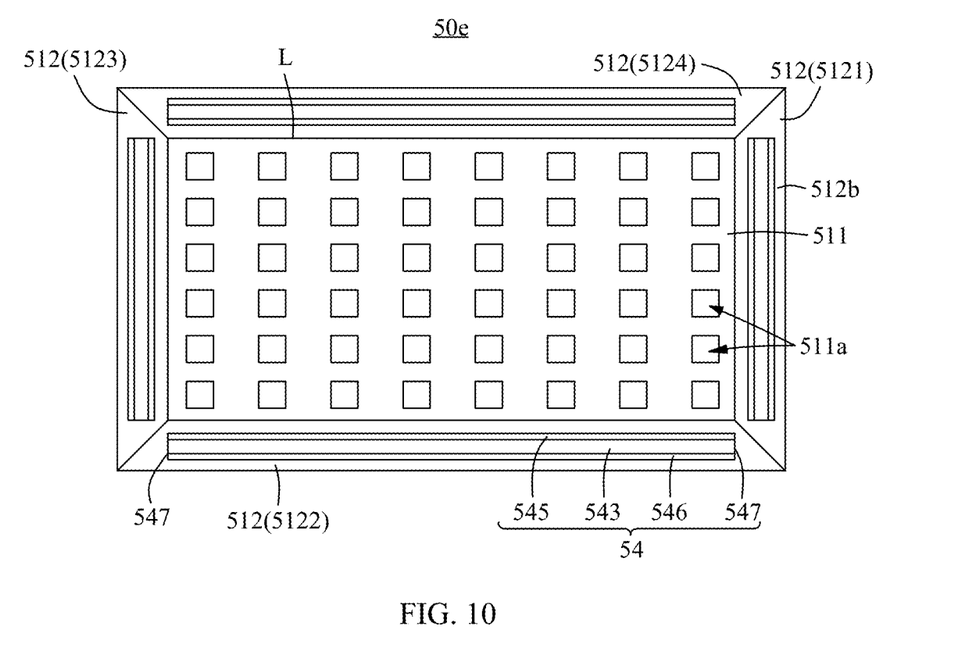
FIG. 10 is a schematic diagram of a rear side of the reflective film in FIG. 8.

FIG. 10 is a schematic diagram of a rear side 512b of a reflective film 50e in FIG. 8. As shown in FIG. 10, a rear side 512b of each inclined part 512 is provided with a support structure 54 to maximally improve a stiffness of the inclined parts 512 of the reflective film 50e and fill gaps G between the reflective layer 51 and the inclined parts 512 of the back plate 41, to effectively mitigate problems such as bulging and collapsing of inclined surfaces of the reflective film 50e.

In another embodiment, a shape of the support structure is not limited to that shown in FIG. 7 and FIG. 10. For example, the support structure may not include the first extending surface and the second extending surface. Alternatively, the support structure may be a pentagonal prism, at least in side surfaces of the pentagonal prism, one side surface is in direct contact with the reflective layer and is fixed, one side surface supports between the reflective layer and the back plate, one side surface is adhered to the back plate, remaining two side surfaces are the transition surfaces. In addition, distribution of the support structure is not limited to FIG. 7 and FIG. 10. For example, the support structure is disposed corresponding to one inclined part. Alternatively, the support structure is disposed corresponding to two inclined parts, and the two inclined parts may be disposed opposite to each other or adjacent to each other, preferably opposite to each other, so that a mechanical strength of the reflective film is approximately uniform. Alternatively, the support structure is disposed corresponding to three inclined parts. In addition, the support structure is not limited to a continuous structure on the inclined parts. For example, a plurality of support structures are provided at a surface of the inclined part at intervals, to provide partial support for the reflective layer; alternatively, the support structures are provided for four corners of the bottom of the reflective layer, to prevent the reflective layer from collapsing or bulging of the four corners.

It should be noted that the reflective film used in the foregoing embodiments may be properly deformed without departing from the spirit and scope of technical solutions of this application. In another words, any two or three combinations of the coating layer, the adhesive tape, the support structure may be provided at the rear side of the reflective layer, and the rear side of the inclined part may be fully or partially covered by any one of the coating layer, the adhesive tape, and the support structure. For example, the support structure is further provided on the coating layer after the rear side of the inclined part is fully or partially provided with the coating layer; alternatively, the support structure is further provided on the adhesive tape after the rear side of the inclined part is fully or partially provided with the adhesive tape; alternatively, the coating layer is provided on a partial region of the inclined part, the partial region is provided with the adhesive tape, the support structure and the like.

In embodiments of this application, the coating layer is provided on, and/or the adhesive tape is adhered to, and/or the support structure is provided on the reflective layer of the reflective film, this may implement an effective support of the inclined parts of the reflective layer, effectively mitigate the problem of collapsing or bulging of the edges of the reflective film, and improve a display effect of the display apparatus using the reflective film. In addition, compared with a design of a full reflective film, in embodiments of this application, improvement of a partial position of the reflective film can reduce the material cost effectively.

The foregoing implementations are merely intended for describing the technical solutions of this application but not for limiting this application. Although this application is described in detail with reference to the exemplary implementations, a person of ordinary skill in the art should understand that modifications or equivalent replacements may be made to the technical solutions of this application without departing from the spirit and scope of this application.

The invention claimed is:

1. A reflective film, comprising:
   a reflective layer, wherein the reflective layer comprises a bottom and inclined parts extending around the bottom, folding lines are provided between the inclined parts and the bottom, when the reflective film is folded along the folding lines, the inclined parts are inclined along peripheral edges of the bottom toward a side away from the bottom, the bottom and the inclined parts together form an accommodating space, a plurality of through holes are provided at intervals in the bottom, the inclined parts each comprise a front side facing the accommodating space and a rear side opposite to the front side, and the front side is configured to reflect light;
   a coating layer, wherein the coating layer is provided on the reflective layer to increase stiffness of the reflective film; and
   support structures, wherein each of the support structures comprises a fixed surface fixed on the rear side, a supporting surface connected to the fixed surface and forming a first preset included angle with the rear side, a transition surface connected to the fixed surface and forming a second preset included angle with the rear side, a first extending surface connected to the supporting surface and extending to cover the rear side, and a second extending surface connected to the transition surface and extending to cover the rear side,
   wherein the first extending surface and the second extending surface are laminated and fixed onto the reflective layer.

2. The reflective film according to claim 1, wherein a material of the coating layer is a transparent curable adhesive, and the transparent curable adhesive is provided at the rear side and/or the front side.

3. The reflective film according to claim 1, wherein a material of the coating layer is a white curable adhesive, the white curable adhesive is provided at the rear side.

4. The reflective film according to claim 1, wherein a thickness of the coating layer ranges from 50 μm to 200 μm.

5. The reflective film according to claim 1, wherein the reflective layer is fully covered by the coating layer.

6. The reflective film according to claim 5, wherein the reflective film further comprises an adhesive tape, and the adhesive tape is adhered to a side that is of the coating layer and that faces away from the reflective layer.

7. The reflective film according to claim 1, wherein the reflective layer is partially covered by the coating layer.

8. The reflective film according to claim 7, wherein the reflective film further comprises an adhesive tape, the adhesive tape is arranged at the same layer as the coating layer, and the adhesive tape is adhered to a position that is on the reflective layer and that is not covered by the coating layer.

9. The reflective film according to claim 1, wherein in a direction perpendicular to the rear side, the fixed surface, the supporting surface, and the transition surface come together to form a right triangle in a cross section of the support structure.

10. The reflective film according to claim 1, wherein the support structure further comprises a joint surface that connects the transition surface and the supporting surface.

11. The reflective film according to claim 10, wherein in a direction perpendicular to the rear side, the fixed surface, the supporting surface, the joint surface, and the transition surface come together to form a right trapezoid in a cross section of the support structure, the fixed surface is a long side of the right trapezoid, and the joint surface is a short side of the right trapezoid.

12. The reflective film according to claim 1, wherein the first preset included angle ranges from 10 degrees to 90 degrees, and the second preset included angle ranges from 10 degrees to 90 degrees.

13. The reflective film according to claim 1, wherein the support structure comprises an organic base and a plurality of inorganic particles dispersed in the organic base.

14. The reflective film according to claim 13, wherein a thickness of the organic base ranges from 50 μm to 300 μm.

15. A backlight module, comprising:
   a back plate, wherein the back plate comprises a bottom plate and side plates surrounding the bottom plate and extending inclinedly along peripheral edges of the bottom plate toward a side away from the bottom plate;
   a plurality of light-emitting elements, located on the bottom plate; and
   a reflective film, the reflective film comprising:
      a reflective layer, wherein the reflective layer comprises a bottom and inclined parts extending around the bottom, folding lines are provided between the inclined parts and the bottom, when the reflective film is folded along the folding lines, the inclined parts are inclined along peripheral edges of the bottom toward a side away from the bottom, the bottom and the inclined parts together form an accommodating space, a plurality of through holes are provided at intervals in the bottom, the inclined parts each comprise a front side facing the accommodating space and a rear side opposite to the front side, and the front side is configured to reflect light;
      a coating layer, wherein the coating layer is provided on the reflective layer to increase stiffness of the reflective film; and
      support structures, wherein each of the support structures comprises a fixed surface fixed on the rear side, a supporting surface connected to the fixed surface and forming a first preset included angle with the rear side, a transition surface connected to the fixed surface and forming a second preset included angle with the rear side, a first extending surface connected to the supporting surface and extending to cover the rear side, and a second extending surface connected to the transition surface and extending to cover the rear side,
      wherein the first extending surface and the second extending surface are laminated and fixed onto the reflective layer, and
      wherein the inclined parts are lapped on the side plates, a position of the bottom corresponds to the bottom plate, and each of the light-emitting elements is exposed out of one of the through holes and is located in the accommodating space.

16. The backlight module according to claim 15, wherein the support structures abut against the side plates.

17. The backlight module according to claim 16, wherein when the support structures comprise joint surfaces, the joint surfaces are bonded to the side plates by an adhesive layer.

18. A display apparatus, comprising:
- a liquid crystal display panel; and
- a backlight module, the backlight module comprising:
- a back plate, wherein the back plate comprises a bottom plate and side plates surrounding the bottom plate and extending inclinedly along peripheral edges of the bottom plate toward a side away from the bottom plate;
- a plurality of light-emitting elements, located on the bottom plate; and
- a reflective film, the reflective film comprising:
    - a reflective layer, wherein the reflective layer comprises a bottom and inclined parts extending around the bottom, folding lines are provided between the inclined parts and the bottom, when the reflective film is folded along the folding lines, the inclined parts are inclined along peripheral edges of the bottom toward a side away from the bottom, the bottom and the inclined parts together form an accommodating space, a plurality of through holes are provided at intervals in the bottom, the inclined parts each comprise a front side facing the accommodating space and a rear side opposite to the front side, and the front side is configured to reflect light;
    - a coating layer, wherein the coating layer is provided on the reflective layer to increase stiffness of the reflective film; and
    - support structures, wherein each of the support structures comprises a fixed surface fixed on the rear side, a supporting surface connected to the fixed surface and forming a first preset included angle with the rear side, a transition surface connected to the fixed surface and forming a second preset included angle with the rear side, a first extending surface connected to the supporting surface and extending to cover the rear side, and a second extending surface connected to the transition surface and extending to cover the rear side,
    - wherein the first extending surface and the second extending surface are laminated and fixed onto the reflective layer, and
- wherein the inclined parts are lapped on the side plates, a position of the bottom corresponds to the bottom plate, and each of the light-emitting elements is exposed out of one of the through holes and is located in the accommodating space,
- wherein the backlight module is located at a side that is of the liquid crystal display panel and that faces away from a display surface of the liquid crystal display panel.

19. The display apparatus according to claim 18, wherein the support structures abut against the side plates.

20. The display apparatus according to claim 19, wherein when the support structures comprise joint surfaces, the joint surfaces are bonded to the side plates by an adhesive layer.

\* \* \* \* \*